US012054375B2

(12) United States Patent
Qiao

(10) Patent No.: US 12,054,375 B2
(45) Date of Patent: Aug. 6, 2024

(54) LIFTING MECHANISM OF AUTOMATED GUIDED VEHICLE AND AUTOMATED GUIDED VEHICLE

(71) Applicant: BEIJING JINGDONG QIANSHI TECHNOLOGY CO., LTD., Beijing (CN)

(72) Inventor: Longlong Qiao, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 364 days.

(21) Appl. No.: 17/608,807

(22) PCT Filed: Apr. 22, 2020

(86) PCT No.: PCT/CN2020/086014

§ 371 (c)(1),
(2) Date: Nov. 4, 2021

(87) PCT Pub. No.: WO2020/238493

PCT Pub. Date: Dec. 3, 2020

(65) Prior Publication Data

US 2022/0306440 A1 Sep. 29, 2022

(30) Foreign Application Priority Data

May 30, 2019 (CN) ......................... 201910462169.1

(51) Int. Cl.
*B66F 9/06* (2006.01)
*B66F 9/075* (2006.01)

(52) U.S. Cl.
CPC .............. *B66F 9/063* (2013.01); *B66F 9/075* (2013.01)

(58) Field of Classification Search
CPC .......... B66F 9/063; B66F 9/075; B66F 9/065; B66F 7/0633; B66F 7/0641; B66F 7/14; B66F 5/025; B65G 35/06; B65G 2207/40
See application file for complete search history.

(56) References Cited

U.S. PATENT DOCUMENTS 5,035,094 A * 7/1991 Legare ................ F16H 25/2056 343/903
9,266,704 B1 * 2/2016 Hall .......................... B66F 3/22
(Continued)

FOREIGN PATENT DOCUMENTS

CN 104192762 A 12/2014
CN 105460842 A 4/2016
(Continued)

OTHER PUBLICATIONS

International Search Report and Written Opinion for PCT/CN2020/086014 mailed Jul. 24, 2020, 17 pages with partial translations.
(Continued)

*Primary Examiner* — Glenn F Myers
(74) *Attorney, Agent, or Firm* — Myers Bigel, P.A.

(57) ABSTRACT

A lifting mechanism of an automated guided vehicle includes: a carrier tray; a base plate; a connecting rod module connected between the carrier tray and the base plate and configured to cause the carrier tray to translate along a first direction; and a lifting module, which is arranged on the base plate, connected to the connecting rod module and located on one side of the connecting rod module and configured to cause the carrier tray to translate by means of driving the connecting rod module, wherein the first direction is a lifting direction of the lifting module lifting the connecting rod module or a direction opposite to the lifting direction. An automated guided vehicle is also disclosed.

19 Claims, 5 Drawing Sheets

(56) References Cited

U.S. PATENT DOCUMENTS

| | | | | |
|---|---|---|---|---|
| 2007/0266809 | A1 | 11/2007 | Ziesel | |
| 2009/0104007 | A1 | 4/2009 | Umezawa et al. | |
| 2011/0041267 | A1* | 2/2011 | Sun | E04H 6/06 182/19 |
| 2014/0374680 | A1* | 12/2014 | Tsang | B62B 3/0612 254/7 C |
| 2015/0014609 | A1* | 1/2015 | Mohr | B66F 7/065 254/122 |
| 2017/0050833 | A1 | 2/2017 | Ooe | |
| 2017/0253283 | A1 | 9/2017 | Eidelson | |

FOREIGN PATENT DOCUMENTS

| | | | |
|---|---|---|---|
| CN | 106672860 | A | 5/2017 |
| CN | 207002119 | U | 2/2018 |
| CN | 109019434 | A | 12/2018 |
| CN | 109264628 | A | 1/2019 |
| CN | 109368546 | A | 2/2019 |
| CN | 208454393 | U | 2/2019 |
| CN | 208898428 | U | 5/2019 |
| CN | 210683089 | U | 6/2020 |
| DE | 102016107451 | A1 | 10/2016 |
| JP | S62244897 | A | 10/1987 |
| JP | 2011006264 | A | 1/2011 |
| JP | 2017039552 | A | 2/2017 |
| JP | 2017047996 | A | 3/2017 |
| KR | 20100125034 | A | 11/2010 |

OTHER PUBLICATIONS

"Communication with Supplementary European Search Report", EP Application No. 20814304.0, Jun. 2, 2023, 8 pp.
"Notice of Reasons for Refusal and English language translation", JP Application No. 2021-570993, Dec. 15, 2022, 12 pp.

* cited by examiner

LIFTING MECHANISM OF AUTOMATED GUIDED VEHICLE AND AUTOMATED GUIDED VEHICLE

CROSS-REFERENCE TO RELATED APPLICATIONS

The present application is a U.S. National Stage Application under 35 U.S.C. § 371 of International Patent Application No. PCT/CN2020/086014, filed on Apr. 22, 2020, which is based on and claims priority to China Patent Application No. CN201910462169.1 filed on May 30, 2019, the disclosures of which are incorporated by reference herein in its their entireties.

TECHNICAL FIELD

The present disclosure relates to the field of an automated guided vehicle, and specifically to a lifting mechanism of an automated guided vehicle and an automated guided vehicle.

BACKGROUND

The automated guided vehicle (AGV) is a transport vehicle that is equipped with electromagnetic or optical automated guided devices, can travel along a defined guidance path, and has safety protection and various transfer functions. In order to achieve a specific transfer function, the automated guided vehicle is required to have a certain lifting capacity, so as to lift the carried goods to a predetermined height.

SUMMARY

In one aspect of the present disclosure, a lifting mechanism of an automated guided vehicle is provided. The lifting mechanism includes: a carrier tray; a base plate; a connecting rod module connected between the carrier tray and the base plate; and a lifting module, which is arranged on the base plate, connected to the connecting rod module and located on one side of the connecting rod module and configured to cause the carrier tray to translate along a first direction by means of driving the connecting rod module; wherein the first direction is a lifting direction of the lifting module lifting the connecting rod module or a direction opposite to the lifting direction.

In some embodiments, the lifting module includes: a first power source; a lifting bracket connected to the connecting rod module; and a transmission assembly having an input end connected to the first power source and an output end connected to the lifting bracket, configured to transmit power outputted by the first power source to the lifting bracket, so that the lifting bracket drives the connecting rod module to translate along the first direction.

In some embodiments, the first power source includes a geared motor, and the transmission assembly includes: an intermediate shaft having a hollow structure, wherein an axis of the intermediate shaft is parallel to the first direction, and a first end of the intermediate shaft is connected to an output end of the geared motor; a lead nut rotatably arranged inside the hollow structure and fixedly connected to a second end of the intermediate shaft; and a lead screw threadedly engaged with the lead nut, and having one end connected to the lifting bracket, wherein an axis of the lead screw is parallel to the first direction, so as to convert a rotational movement of the lead nut into a translational movement of the lifting bracket along the first direction.

In some embodiments, the transmission assembly further includes: a first gear connected to an output end of the first power source; and a second gear fixedly connected to the first end of the intermediate shaft and meshing with the first gear.

In some embodiments, the lifting module further includes: a case, which at least partially accommodates the transmission assembly and is fixedly connected to the first power source to realize integrated assembling and disassembling of the lifting module.

In some embodiments, a first stepped hole and a second stepped hole having different sizes are provided inside the case, the intermediate shaft has a first stepped shaft section and a second stepped shaft section having different sizes, and the transmission assembly further including: a first tapered roller bearing arranged between the first stepped hole and the first stepped shaft section, and supporting the first end of the intermediate shaft along a radial direction; a second tapered roller bearing arranged between the second stepped hole and the second stepped shaft section, and supporting the second end of the intermediate shaft along the radial direction and an axial direction; and a locking retainer ring fixedly arranged at the first end of the intermediate shaft, and supporting the first tapered roller bearing along the axial direction.

In some embodiments, the transmission assembly further includes: a first dust-proof ring being in interference fit with an outer cylindrical surface of the locking retainer ring, and in clearance fit with the first tapered roller bearing and the case respectively; and a second dust-proof ring arranged on the case, and located on one side of the second tapered roller bearing adjacent to the lifting bracket.

In some embodiments, the intermediate shaft includes: a first hollow shaft cavity and a second hollow shaft cavity which are arranged along the axis of the intermediate shaft, wherein the second hollow shaft cavity communicates with the first hollow shaft cavity, and an inner diameter of the second hollow shaft cavity is greater than each of the inner diameter of the first hollow shaft cavity and a circumscribed circle diameter of the lead nut; a portion of the lead screw adjacent to the lifting bracket is fitted within the lead nut and a portion away from the lifting bracket is fitted within the first hollow shaft cavity, when the lifting module is not lifted.

In some embodiments, a screw fixing hole is provided at a junction between the lifting bracket and the lead screw, the screw fixing hole accommodates the lead screw and restricts a rotation of the lead screw.

In some embodiments, the lifting module further includes: a slide rail fixedly arranged on the lifting bracket, wherein an extending direction of the slide rail is parallel to the first direction; and a guided block arranged on the case and fitted over the slide rail, wherein a cross-sectional shape of the guided block nestedly matched with a cross-sectional shape of the slide rail so as to guide the slide rail to move along the first direction.

In some embodiments, the slide rails is two slide rails, the guided block is two guided blocks, the two guided blocks are matched with the two slide rails respectively, the two slide rails are arranged symmetrically, and the axis of the lead screw is located on a symmetry plane of the two slide rails; the case includes: two guided block fixing lugs symmetrically arranged on both sides of the case and respectively connected to the two guided blocks.

In some embodiments, the case includes: an electric motor fixing lug fixedly connected to a housing of the first power source, and configured to cause an axis of the output shaft of the first power source to be parallel to the first direction, and cause the axis of the output shaft of the first power source is located on the symmetry plane.

In some embodiments, the lifting mechanism further includes: a rotary module arranged between the connecting rod module and the carrier tray, and configured to drive the carrier tray to rotate relative to the connecting rod module.

In some embodiments, the rotary module includes: a rotary support inner ring fixedly arranged on one side of the connecting rod module adjacent to the carrier tray; and a rotary support outer ring fixedly arranged on one side of the carrier tray adjacent to the connecting rod module and rotatably supported on the rotary support inner ring.

In some embodiments, the rotary support outer ring includes an outer ring gear, and the rotary module further includes: a second power source fixedly arranged on the connecting rod module; and a third gear, which is in transmission connection with an output end of the second power source, and configured to drive the carrier tray to rotate by meshing with the outer gear ring.

In some embodiments, the connecting rod module includes: an upper mounting plate configured to support the carrier tray; an intermediate frame arranged parallel to the upper mounting plate; a first connecting rod assembly arranged between the upper mounting plate and the intermediate frame, and configured to change a distance between the upper mounting plate and the intermediate frame; and a second connecting rod assembly arranged between the intermediate frame and the base plate, and configured to change a distance between the intermediate frame and the base plate.

In some embodiments, the first connecting rod assembly includes: a first connecting rod having a first end hinged to the upper mounting plate through a first hinge shaft, and a second end hinged to the intermediate frame through a second hinge shaft; the second connecting rod assembly includes: a second connecting rod having a first end hinged to the intermediate frame through a third hinge shaft, and a second end hinged to the base plate through a fourth hinge shaft; the second hinge shaft and the third hinge shaft are arranged coaxially, so that the second end of the first connecting rod is hinged at the same position of the intermediate frame as the first end of the second connecting rod; the first connecting rod has the same length as the second connecting rod, and axes of the first hinge shaft, the second hinge shaft, the third hinge shaft, and the fourth hinge shaft are parallel to each other; and the connecting rod module is connected to the lifting module through the first hinge shaft, and an orthographic projection of the axis of the first hinge shaft overlaps with an orthographic projection of the axis of the fourth hinge shaft on the base plate during a process of driving the connecting rod module by the lifting module.

In some embodiments, the intermediate frame includes: a first groove arranged on one end of the intermediate frame and penetrating through the one end of the intermediate frame along a vertical direction, and forming a first accommodating space with the first connecting rod assembly (33) and the second connecting rod assembly (34); and a second groove arranged on one end of the intermediate frame away from the first groove and penetrating through the one end of the intermediate frame away from the first groove along the vertical direction, and forming a second accommodating space with the first connecting rod assembly (33) and the second connecting rod assembly (34); wherein orthographic projections of the first connecting rod assembly and the second connecting rod assembly on the base plate do not overlap with orthographic projections of the first groove and the second groove on the base plate during a process of driving the connecting rod module by the lifting module.

In some embodiments, the lifting mechanism further includes: a photoelectric sensor arranged on the connecting rod module, and configured to detect a distance of the carrier tray relative to the base plate.

In another aspect of the present disclosure, an automated guided vehicle is provided. The automated guided vehicle includes the lifting mechanism according to any one of the preceding embodiments.

BRIEF DESCRIPTION OF THE ACCOMPANYING DRAWINGS

The accompanying drawings described here are intended to provide a further understanding of the present disclosure and constitute a part of the present disclosure. The illustrative embodiments of the present disclosure as well as the descriptions thereof, which are intended for explaining the present disclosure, do not constitute improper definitions on the present disclosure. In the accompanying drawings.

In the accompanying drawings.

Figure 1:
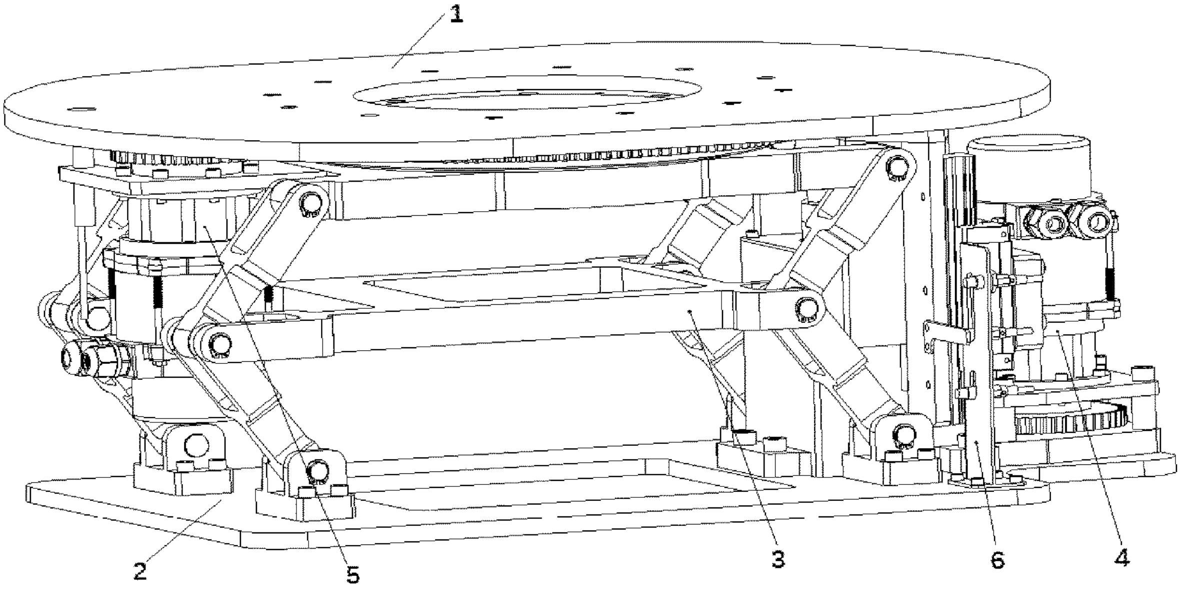
FIG. 1 is a schematic view of the overall structure of a lifting mechanism of an automated guided vehicle according to some embodiments of the present disclosure.

1. carrier tray;

2. base plate;

3. connecting rod module; 31. upper mounting plate; 32. intermediate frame; 321. first groove; 322. second groove; 33. first connecting rod assembly; 331. first connecting rod; 332. first hinge shaft; 333. second hinge shaft; 34. second connecting rod assembly; 341. second connecting rod; 342. third hinge shaft; 343. fourth hinge shaft;

4. lifting module; 41. first power source; 411. first gear; 42. lifting bracket; 421. screw fixing hole; 43. transmission assembly; 431. intermediate shaft; 431*a*. first stepped shaft section; 431*b*. second stepped shaft section; 431*c*. first hollow shaft cavity; 431*d*. second hollow shaft cavity; 432. lead nut; 433. lead screw; 434. second gear; 435. first tapered roller bearing; 436. second tapered roller bearing; 437. locking retainer ring; 438. first dust-proof ring; 439. second dust-proof ring; 44. case; 441. first stepped hole; 442. second stepped hole; 443. guided block fixing lug; 444. electric motor fixing lug; 45. slide rail; 451. symmetry plane; 46. guided block; 47. connecting hole for connecting rod assembly;

5. rotary module; 51. rotary support inner ring; 52. rotary support outer ring; 53. second power source; 54. third gear;

6. photoelectric sensor.

It should be understood that the dimensions of various parts shown in the accompanying drawings are not drawn according to actual proportional relations. In addition, the same or similar components are denoted by the same or similar reference signs.

DETAILED DESCRIPTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those of ordinary skill in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention. At the same time, it should be understood that, for ease of description, the dimensions of various parts shown in the accompanying drawings are not drawn according to actual proportional relations. The techniques, methods, and apparatuses known to those of ordinary skill in the relevant art might not be discussed in detail. However, the techniques, methods, and apparatuses shall be considered as a part of the granted description where appropriate. Among all the examples shown and discussed here, any specific value shall be construed as being merely exemplary, rather than as being restrictive. Thus, other examples in the exemplary embodiments may have different values. It is to be noted that: similar reference signs and letters present similar items in the following accompanying drawings, and therefore, once an item is defined in one accompanying drawing, it is necessary to make further discussion on the same in the subsequent accompanying drawings.

The relevant automated guided vehicles known to the inventors usually perform lifting operations in a lifting manner such as lead screws, slide rails or wedge blocks. Taking the lead screw as an example, the relevant automated guided vehicle uses the form of jacking by a plurality of lead screws, the goods placed on the top of the plurality of lead screws are lifted smoothly by synchronously adjusting the height of the plurality of lead screws. However, in the form of jacking by a plurality of lead screws, it is possible to cause the lead screw to bear the axial force whilst further bearing the radial force under the condition of vehicle travelling or unbalanced loading of the goods, which does not conform to the standard operation specifications of the lead screw so that it is easily to lead to failure of the lead screw assembly due to improper use. In addition, it is more difficult to synchronously adjust the height of the plurality of lead screws, and there may be a slip-off risk of the goods if the height adjustment process is slightly asynchronous.

Moreover, some automated guided vehicles use the form of jacking by hollow lead screws, smoothly carry the carried goods and increase the radial force bearing capacity of the lead screw by using a large shaft diameter of the hollow screw. However, there are high requirements for the precision of the hollow lead screw, which increases the machining difficulty and the machining cost. In addition, although the hollow lead screw has a certain radial force bearing capacity, it is still possible to cause damage to the structure of the lead screw if the lead screw is subjected to a radial force for a long time during the use.

For the automated guided vehicles that perform lifting operations in the form of slide rails or wedge blocks, the components thereof related to lifting occupy more space and also require more auxiliary devices, which causes the automated guided vehicles to be in a high cost as a whole and inconvenient to be assembled and disassembled.

As shown in FIGS. 1-9, in one aspect of the present disclosure, a lifting mechanism of an automated guided vehicle is provided. The lifting mechanism includes: a carrier tray 1; a base plate 2; a connecting rod module 3, which is connected between the carrier tray 1 and the base plate 2 and is capable of causing the carrier tray 1 to translate along a first direction; and a lifting module 4, which is arranged on the base plate 2, connected to the connecting rod module 3 and located on one side of the connecting rod module 3 and capable of causing the carrier tray 1 to translate by means of driving the connecting rod module 3; wherein the first direction is the lifting direction of the lifting module 4 lifting the connecting rod module 3 or a direction opposite to the lifting direction.

The lifting mechanism is integrally mounted on the automated guided vehicle through the upper carrier tray 1 and the lower base plate 2, so as to provide the automated guided vehicle with the function of raising or lowering the carrier height. On such basis, in the present application, the connecting rod module controls the direction of the translational movement of the carrier tray 1, and then drives the connecting rod module 3 by means of the lifting module 4, thereby making the bearing function and the power function of the lifting module 4 independent from each other, and further reducing failure of the lifting structure that might be caused by the unbalanced loading of the carried object.

Specifically, the lifting module 4 in the related art usually simultaneously assumes the bearing function and the power function, that is, it is not only required to support the carrier tray 1 but also required to control the height of the position of the carrier tray 1. In the case of the unbalanced loading of the goods or an acceleration/deceleration movement of the automated guided vehicle, the lifting module 4 in the related art will simultaneously bear a load in a vertical direction and a moment perpendicular to a vertical direction. Take a kinematic pair of the lead screw 433 and the lead nut 432 commonly used in the lifting module 4 as an example. In this case, the lead screw 433 in the lifting module 4 will simultaneously bear the axial force caused by the load in a vertical direction, and the radial force caused by the moment perpendicular to a vertical direction. The radial force is very harmful to the lead screw 433 that is required to bear the load and the movement, which is easily to cause damage to the structure of the lead screw 433, thereby easily leading to the overall failure of the lifting structure.

FIG. 1 is a schematic view of the overall structure of a lifting mechanism of an automated guided vehicle according to some embodiments of the present disclosure. It should be noted that, as shown in FIG. 1, the translation direction of the carrier tray 1 is vertically upward or downward, and the lifting direction of the lifting module 4 to the connecting rod module 3 is vertically upward, that is, the first direction is a vertical direction at this time. However, for those skilled in the art, for the requirements in different lifting direction, the first direction which is not limited to a vertical direction, may have a certain angle with the vertical direction. Correspondingly, at this time, the connecting rod module 3 is correspondingly configured to translate the carrier tray 1 along the corresponding first direction, and the driving force of the lifting module 4 to the connecting rod module 3 may also have the same included angle with the vertical direction accordingly. With the first direction having a certain angle with the vertical direction as a translation direction of the carrier tray 1, the lifting mechanism can meet a larger number of more complex goods handling scenarios and requirements, and therefore has wider applicability.

Figure 2:
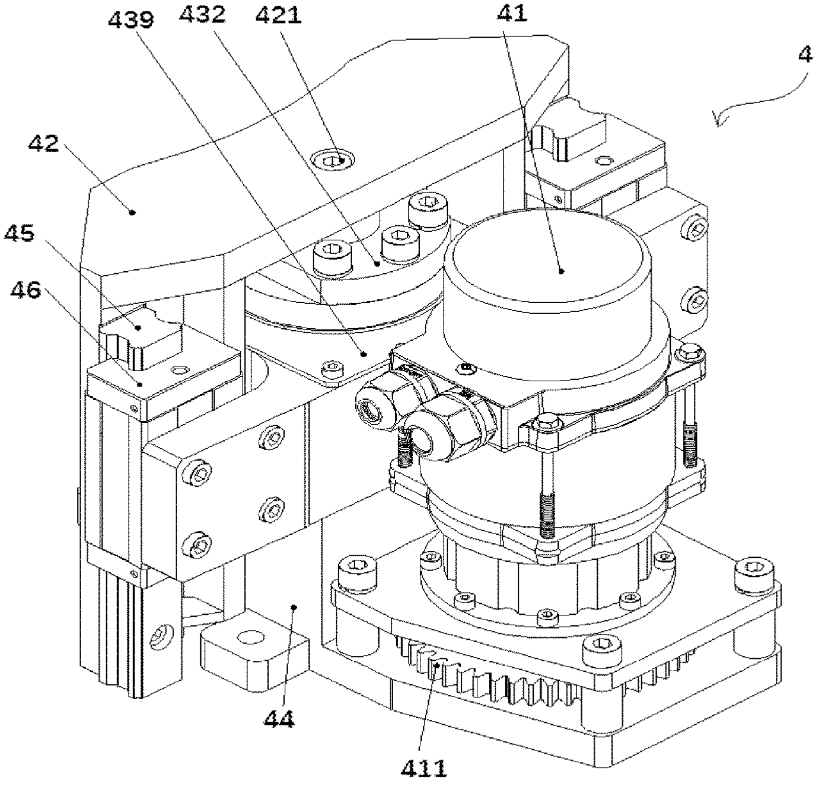
FIG. 2 is a schematic structural view of a lifting module of an automated guided vehicle according to some embodiments of the present disclosure.

FIG. 2 is a schematic structural view of a lifting module of an automated guided vehicle according to some embodiments of the present disclosure. As shown in FIG. 2, in some embodiments, the lifting module 4 includes: a first power source 41; a lifting bracket 42, which is connected to the connecting rod module 3; and a transmission assembly 43 having an input end connected to the first power source 41 and an output end is connected to the lifting bracket 42, which is capable of transmitting the power output by the first power source 41 to the lifting bracket 42, so that the lifting bracket 42 drives the connecting rod module 3 to translate along the first direction.

In order to allow the lifting module 4 to only bear the axial load during the process of driving the connecting rod module 3, a lifting bracket 42 is further provided between the lifting module 4 and the connecting rod module 3 to connect the lifting module 4 and the connecting rod module 3, and only transmit the radial force (that is, the load along the first direction) to the lifting module 4.

In order to implement effectively lifting the carrier tray 1, the first power source 41 is drive-connected to the lifting bracket 42 through the transmission assembly 43, so that the lifting force is conducted to the carrier tray 1 through the lifting bracket 42. In addition, considering that the lifting bracket 42 is driven in the form of a translational movement, and the first power source 41 usually outputs power by a rotational movement, in the present application, the power of the input end of the transmission assembly 43 is further transmitted to the output end thereof, whilst converting the power form into the power form corresponding to the lifting bracket 42.

Figure 3:
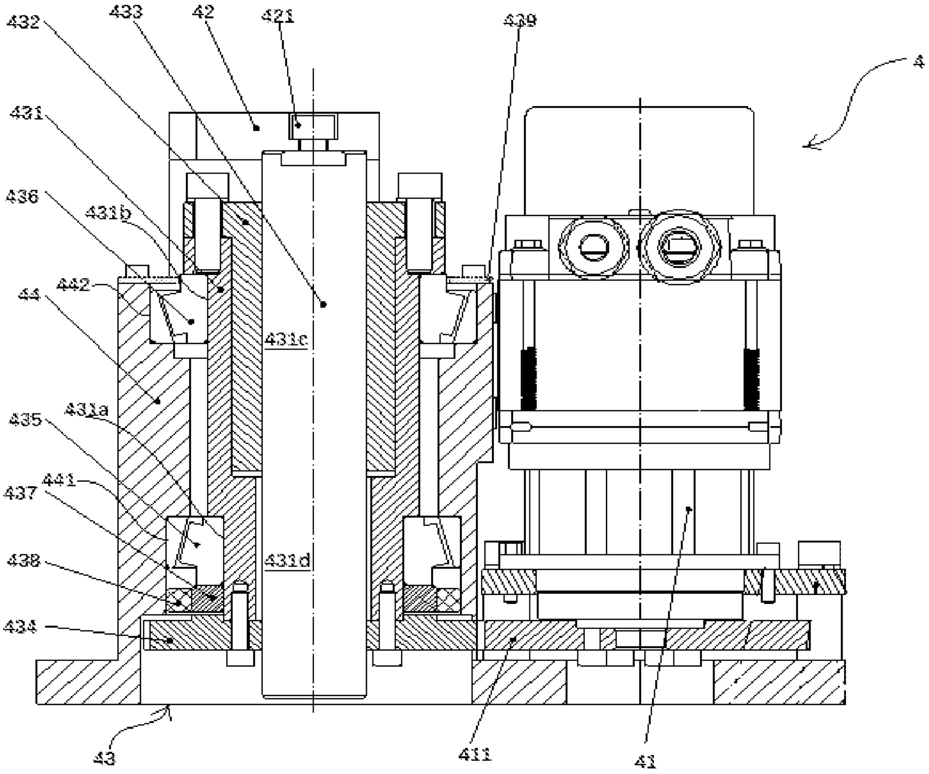
FIG. 3 is a schematic cross-sectional structure view of a lifting module of an automated guided vehicle according to some embodiments of the present disclosure.

FIG. 3 is a schematic cross-sectional structure view of a lifting module of an automated guided vehicle according to some embodiments of the present disclosure. As shown in FIG. 3, in some embodiments, the first power source 41 is a geared motor, and the transmission assembly 43 includes: an intermediate shaft 431 having a hollow structure, wherein an axis the intermediate shaft 431 is parallel to the first direction, and a first end of the intermediate shaft 431 is connected to an output end of the geared motor; a lead nut 432 rotatably arranged inside the hollow structure and fixedly connected to a second end of the intermediate shaft 431; and a lead screw 433 threadedly engaged with the lead nut 432, and having one end connected to the lifting bracket 42, wherein an axis of the lead screw 433 is parallel to the first direction, so as to convert a rotational movement of the lead nut 432 into a translational movement of the lifting bracket 42 along the first direction.

In order to further reduce the volume of the lifting mechanism, the first power source 41 is preferably a geared motor, that is, an integrated power source that contains the function of a reducer and the function of an electric motor, and can directly provide the transmission assembly 43 with the rated rotation speed required by the transmission assembly 43 as an output power.

When the first power source 41 is a geared motor and the lifting bracket 42 is required to be driven in the form of translation, the transmission assembly 43 should be at least capable of converting the rotational movement output by the geared motor into the translational movement required by the lifting bracket 42. At this time, the transmission assembly 43 is preferably a power pair of a lead nut 432 and a lead screw 433, which can drive the lead screw 433 by means of the rotational movement of the lead nut 432. In the case where the lead nut 432 is threaded matched with the lead screw 433, the rotational movement is converted into the translational movement of the lead screw 433.

In order to realize the power connection between the lead nut 432 and the geared motor under the premise of ensuring the structural stability of the lead nut 432, the transmission assembly introduces an intermediate shaft 431 as a power connection member between the lead nut 432 and the geared motor. That is, one end of the intermediate shaft 431 with a certain length is connected to the geared motor, the other end is connected to the lead nut 432.

In order to further reduce the volume of the transmission assembly 43, the intermediate shaft 431 has a hollow structure, so that the lead nut 432 is accommodatably mounted inside the hollow structure of the intermediate shaft 431; and the lead screw 433 is accommodated inside the lead nut 432, and external thread of the lead screw 433 and the internal thread of the lead nut 432 are mated each other.

In order to ensure that the lead screw 433 does not bear loads in other directions than the axial load, the axis of the lead screw 433 is parallel to the first direction. Then, during the power conversion process of the transmission assembly 43, the rotational movement of the lead nut 432 is converted into a translational movement of the lifting bracket 42 along the first direction.

In some embodiments, in order to realize the power connection between the first power source 41 and the intermediate shaft 431, the transmission assembly 43 further includes: a first gear 411, which is connected to the output end of the first power source 41; and a second gear 434, which is fixedly connected to the first end of the intermediate shaft 431 and meshes with the first gear 411.

FIG. 2 is a schematic structural view of a lifting module of an automated guided vehicle according to some embodiments of the present disclosure. As shown in FIG. 2, in some embodiments, the lifting module 4 further includes: a case 44, which at least partially accommodates the transmission assembly 43 and is fixedly connected to the first power source 41 to realize the integrated assembling and disassembling of the lifting module 4.

FIG. 3 is a schematic cross-sectional structure view of a lifting module of an automated guided vehicle according to some embodiments of the present disclosure. In order to realize the flexible rotation of the intermediate shaft 431 relative to the case 44, as shown in FIG. 3, in some embodiments, a first stepped hole 441 and a second stepped hole 442 having different sizes are provided inside the case, the intermediate shaft 431 has a first stepped shaft section 431*a* and a second stepped shaft section 431*b* having different sizes. The transmission assembly 43 further includes: a first tapered roller bearing 435, which is arranged between the first stepped hole 441 and the first stepped shaft section 431*a*, and supports the first end of the intermediate shaft 431 along the radial direction; a second tapered roller bearing 436, which is arranged between the second stepped hole 442 and the second stepped shaft section 431*b*, and supports the second end of the intermediate shaft 431 along the radial direction and the axial direction; and a locking retainer ring 437, which is fixedly arranged at the first end of the intermediate shaft 431 and capable of supporting the first tapered roller bearing 435 along the axial direction.

Since the tapered roller bearing can provide radial support for the intermediate shaft 431 whilst providing axial support for the intermediate shaft 431, corresponding first stepped hole 441 and second stepped hole 442, and first stepped shaft section 431*a* and second stepped shaft section 431*b* are respectively provided inside the case 44 and outside the intermediate shaft 431.

The first stepped hole 441 together with the first stepped shaft, only provide a support effect along the first direction which is toward the end away from the lifting bracket 42, whilst providing radial support for the first tapered roller bearing 435. Therefore, the locking retainer ring 437 fixed on the first end of the intermediate shaft 431 can provide support for the first tapered roller bearing 435 along the first direction which is toward the end adjacent to of the lifting bracket 42, so that the first tapered roller bearing 435 is operable stably. In some embodiments, the outer circumferential surface of the first end of the intermediate shaft 431 is provided with threads, so that the locking retainer ring 437 may be fixedly mounted to the intermediate shaft 431 in a detachable manner in the form of threaded mating.

As shown in FIG. 3, in order to prevent ambient dust from affecting the first tapered roller bearing 435 and the second tapered roller bearing 436, in some embodiments, the transmission assembly 43 further includes: a first dust-proof ring 438 which is in interference fit with an outer cylindrical surface of the locking retainer ring 437, and in clearance fit with the first tapered roller bearing 435 and the case 44 respectively; and a second dust-proof ring 439, which is arranged on the case 44 and located on one side of the second tapered roller bearing 436 adjacent to the lifting bracket 42.

In some embodiments, in order to further reduce the volume of the transmission assembly 43, the intermediate shaft 431 includes: a first hollow shaft cavity 431*c* and a second hollow shaft cavity 431*d*, which are arranged along the axis of the intermediate shaft 431. The second hollow shaft cavity 431*d* communicates with the first hollow shaft cavity 431*c*, and the inner diameter of the second hollow shaft cavity 431*d* is greater than the inside diameter of the first hollow shaft cavity and the circumscribed circle diameter of the lead nut 432. When the lifting module 4 is not lifted, a portion of the lead screw 433 adjacent to the lifting bracket 42 is fitted within the lead nut 432, and a portion of the lead screw 433 away from the lifting bracket 42 is fitted within the first hollow shaft cavity 431*c*.

Based on the intermediate shaft 431 with a two-section cavity structure having a first hollow shaft cavity 431*c* and a second hollow shaft cavity 431*d*, when the lifting module 4 is not in a lifting state, it is possible to allow that portions of the lead nut 432 and the lead screw 433 adjacent to the lifting bracket 42 are provided within the second hollow shaft cavity 431*d*, and in a lifting state, the lead screw 433 will extend from the lead nut 432, to adequately release a length of the portion that is initially provided within the first hollow shaft cavity 431*c*, thereby providing a sufficient lifting stroke for the lifting module 4.

Figure 6:
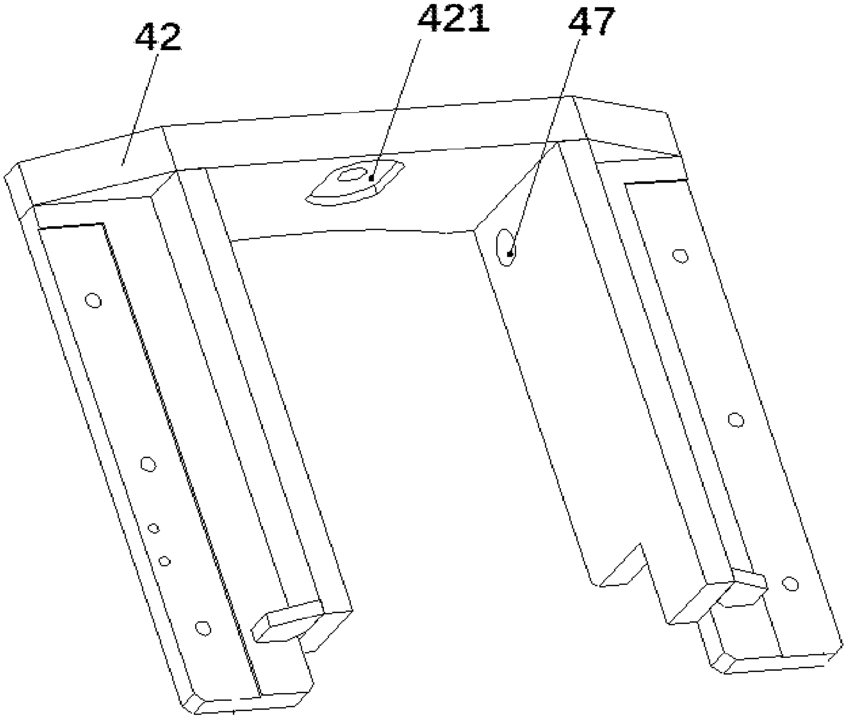
FIG. 6 is a schematic structural view of a lifting bracket of an automated guided vehicle according to some embodiments of the present disclosure.
Figure 7:
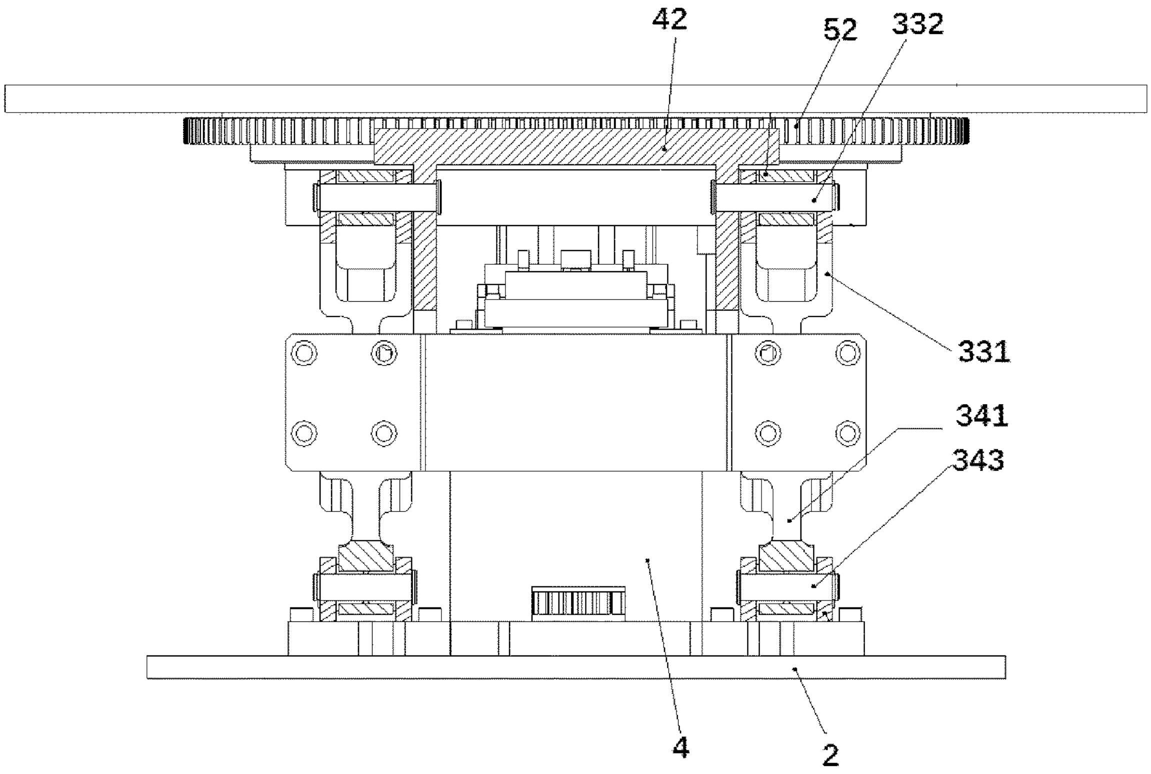
FIG. 7 is a schematic structural view of a lifting module of an automated guided vehicle according to some embodiments of the present disclosure from a side view.

FIG. 6 is a schematic structural view of a lifting bracket of an automated guided vehicle according to some embodiments of the present disclosure. As shown in FIG. 6, in order to allow that the lead screw 433 does not rotate during the driving of matching gears of the lead screw 433 and the lead nut 432, in some embodiments, a screw fixing hole 421 is provided at the junction between the lifting bracket 42 and the lead screw 433. The screw fixing hole 421 can accommodate the lead screw 433 and restrict the rotation of the lead screw 433.

Figure 4:
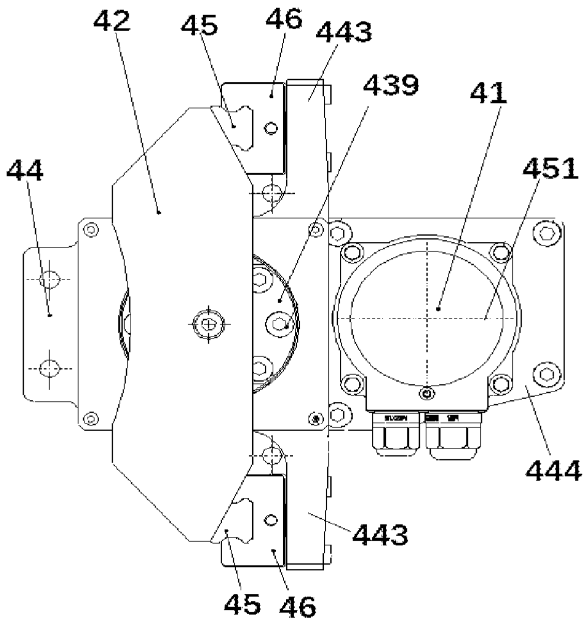
FIG. 4 is a schematic structural view of a top view angle of a lifting module of an automated guided vehicle according to some embodiments of the present disclosure.
Figure 5:
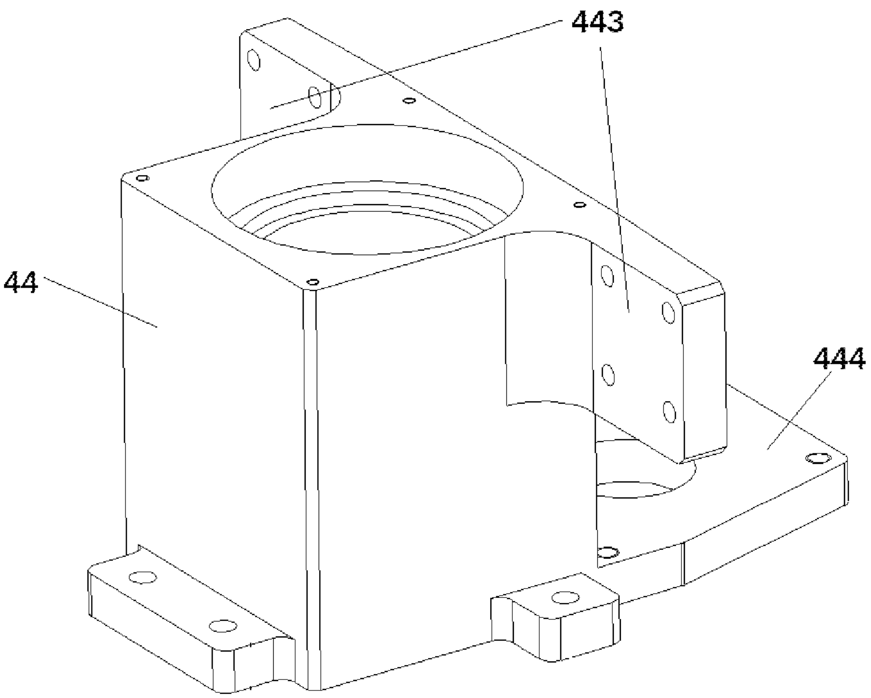
FIG. 5 is a schematic structural view of a case of an automated guided vehicle according to some embodiments of the present disclosure.

FIG. 2 is a schematic structural view of a lifting module of an automated guided vehicle according to some embodiments of the present disclosure; and FIG. 4 is a schematic structural view of a top view angle of a lifting module of an automated guided vehicle according to some embodiments of the present disclosure. As shown in FIGS. 2 and 4, in some embodiments, in order to further ensure that the lead screw 433 only bears the load along the first direction, the lifting module 4 further includes: a slide rail 45, which is fixedly arranged on the lifting bracket 42, wherein an extending direction of the slide rail 45 is parallel to the first direction; and a guided block 46, which is arranged on the case 44 and fitted over the slide rail 45, wherein the guided block 46 has a cross-sectional shape nestedly matched with the cross-sectional shape of the slide rail 45 so as to guide the slide rail 45 to move along the first direction.

Based on the nested matching between the slide rail 45 and the guided block 46, the load on the lifting bracket 42 along other directions than the first direction will be transferred to the case 44 by the guided block 46 and the slide rail 45, thereby reducing the radial force borne by the lead screw 433.

In order to ensure the load balance of the case 44, in some embodiments, the slide rails 45 is two slide rails 45, the guided block is two guided blocks 46. The two guided blocks 46 are matched with the two slide rails 45 respectively, and the two slide rails 45 are arranged symmetrically, and the axis of the lead screw 433 is located on the symmetry plane 451 of the two slide rails 45.

In order to facilitate fixing the guided blocks to the case 44, the case 44 includes: two guided block fixing lugs 443, which are symmetrically arranged on both sides of the case 44 and connected to the two guided blocks 46 respectively.

In some embodiments, in order to improve the integrity of the lifting mechanism, the case 44 includes: an electric motor fixing lug 444, which is fixedly connected to the housing of the first power source 41, and configured to cause that an axis of the output shaft of the first power source 41 to be parallel to the first direction, and cause the axis of the output shaft of the first power source 41 is located on the symmetry plane 451.

Figure 9:
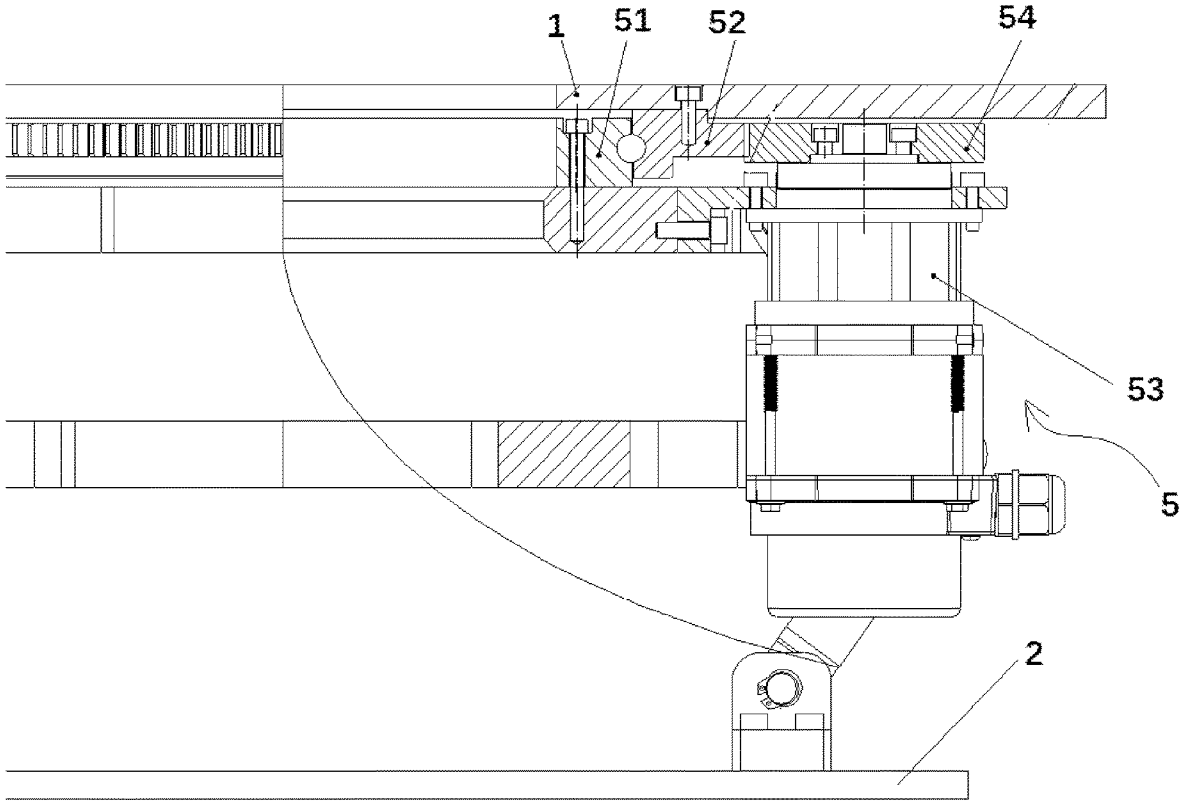
FIG. 9 is a schematic structural view of a rotary module of an automated guided vehicle according to some embodiments of the present disclosure.

FIG. 9 is a schematic structural view of a rotary module of an automated guided vehicle according to some embodiments of the present disclosure. In order to realize the rotatable function of the carrier tray 1, as shown in FIG. 9, in some embodiments, the lifting mechanism further includes: a rotary module 5, which is arranged between the connecting rod module 3 and the carrier tray 1, and capable of driving the carrier tray 1 to rotate relative to the connecting rod module 3.

In some embodiments, the rotary module 5 includes: a rotary support inner ring 51, which is fixedly arranged on one side of the connecting rod module 3 adjacent to the carrier tray 1; and a rotary support outer ring 52, which is fixedly arranged on one side of the carrier tray 1 adjacent to the connecting rod module 3 and rotatably supporting the rotary support inner ring 51.

The rotary support inner ring 51 and the rotary support outer ring 52 are fixedly arranged on the connecting rod assembly and the carrier tray 1 respectively and rotatably connected therebetween to realize the rotatable connection of the carrier tray 1 relative to the connecting rod assembly.

In some embodiments, as shown in FIG. 9, the rotary support between the rotary support inner ring 51 and the rotary support outer ring 52 may be implemented in view of ball bearings.

In order to implement driving the rotary module 5, in some embodiments, the rotary support outer ring 52 includes an outer ring gear, and the rotary module 5 further includes: a second power source 53, which is fixedly arranged on the connecting rod module 3; and a third gear 54, which is in transmission connection with the output end of the second power source 53 and capable of driving the carrier tray 1 to rotate by meshing with the outer gear ring.

Figure 8:
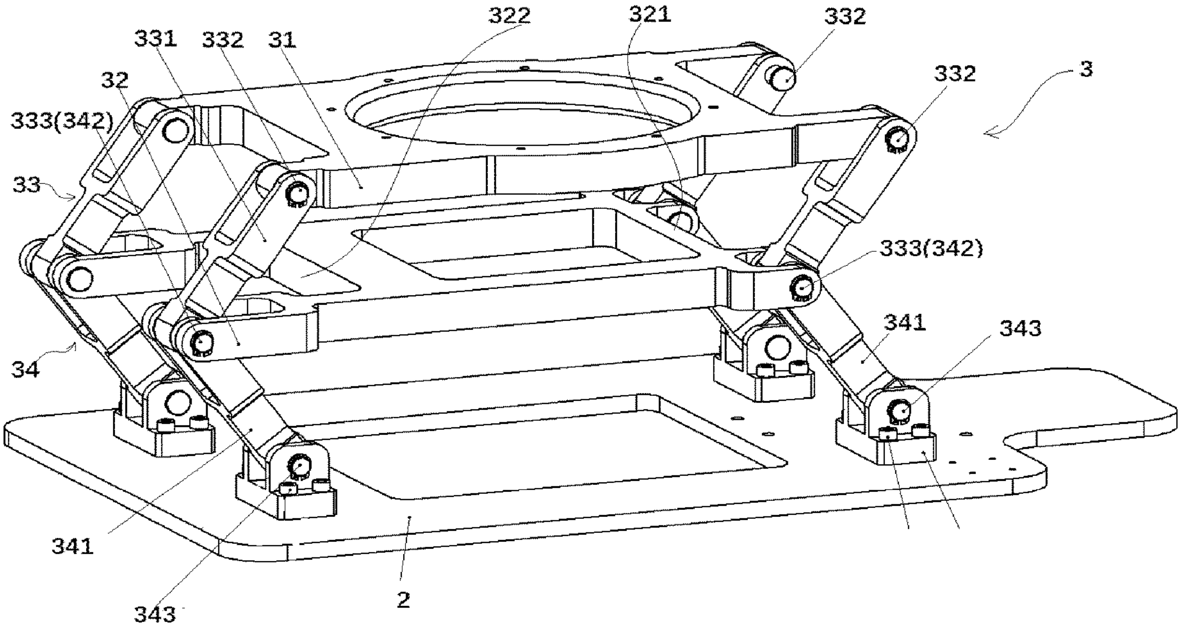
FIG. 8 is a schematic structural view of a connecting rod module of an automated guided vehicle according to some embodiments of the present disclosure.

FIG. 8 is a schematic structural view of a connecting rod module of an automated guided vehicle according to some embodiments of the present disclosure. Moreover, as shown in FIG. 8, in some embodiments, the connecting rod module 3 includes: an upper mounting plate 31 for supporting the carrier tray 1; an intermediate frame 32, which is arranged parallel to the upper mounting plate 31; a first connecting rod assembly 33, which is arranged between the upper mounting plate 31 and the intermediate frame 32, and capable of changing a distance between the upper mounting plate 31 and the intermediate frame 32; and a second connecting rod assembly 34, which is arranged between the intermediate frame 32 and the base plate 2, and capable of changing a distance between the intermediate frame 32 and the base plate 2.

As shown in FIG. 8, the connecting rod assembly takes the form that two stages of connecting rods are sandwiched among three layers of planes (the carrier tray 1—the first connecting rod assembly 33—the intermediate frame 32—the second connecting rod assembly 34—the base plate 2), which not only ensures the overall stability of the connecting rod assembly by the intermediate frame 32, but also allowing the connecting rod module to have sufficient telescopic space by the two stages of connecting rod assemblies.

In order to realize the interconnection among the carrier tray 1—the first connecting rod assembly 33—the intermediate frame 32—the second connecting rod assembly 34—the base plate 2, in some embodiments, the first connecting rod assembly 33 includes: a first connecting rod 331 having a first end hinged to the upper mounting plate 31 through a first hinge shaft 332, and a second end hinged to the intermediate frame 32 through a second hinge shaft 333. The second connecting rod assembly 34 includes: a second connecting rod 341 having a first end hinged to the intermediate frame 32 through a third hinge shaft 342, and a second end hinged to the base plate 2 through a fourth hinge shaft 343.

The first connecting rod 331 or the second connecting rod 341 which is hingedly mounted to the carrier tray 1, the intermediate frame 32 or the base plate 2 can change the distance among three layers of planes in such a manner as to rotate about the hinge point, thereby changing the distance between the upper mounting plate 31 of the connecting rod module 3 and the base plate 2. Of course, for those skilled in the art, the first connecting rod assembly 33 and the second connecting rod assembly 34 may also change the distance between the upper mounting plate 31 and the base plate 2 in the form of a telescopic connecting rod.

Compared with the form of a telescopic connecting rod, the connecting rod in the hinged and rotatable form has a simple structure, so that the connecting rod module 3 has a small overall volume, and the hinged connecting rod may also transmit a moment, so that it is possible to transfer a reflection moment caused by the unbalanced loading of the goods or the acceleration/deceleration of the automated guided vehicle from the upper mounting plate to the base plate 2. In this way, the deflection moment is not exerted on other functional modules of the automated guided vehicle, thereby improving the overall structural reliability of the vehicle.

In order to further simplify the connecting rod module 3, as shown in FIG. 8, in some embodiments, the second hinge shaft 333 and the third hinge shaft 342 are arranged coaxially, so that the second end of the first connecting rod 331 is hinged at the same position of the intermediate frame 32 as the first end of the connecting rod 341.

The second hinge shaft 333 and the third hinge shaft 342 that are coaxially arranged in a group are jointly hingedly mounted on the intermediate frame 32, so that only one corresponding hinge hole is required to be provided on the intermediate frame 32, and one corresponding hinge pin/shaft and one corresponding shaft clip are only provided to simplify the structure of the intermediate frame 32.

In some embodiments, the first connecting rod 331 has the same length as the second connecting rod 341, and the axes of the first hinge shaft 332, the second hinge shaft 333, the third hinge shaft 342, and the fourth hinge shaft 343 are parallel to each other.

The axes of the first hinge shaft 332, the second hinge shaft 333, the third hinge shaft 342, and the fourth hinge shaft 343 are arranged to be parallel to each other, so that the rotation planes of the first connecting rod 331 and the second connecting rod 341 are parallel or coplanar. Moreover, the first connecting rod 331 and the second connecting rod 341 having the same length may have trajectory circles of the same radius length, with the second hinge point and the third hinge point as the centers of circle respectively.

In some embodiments, the connecting rod module 3 is connected to the lifting module 4 through the first hinge shaft 332. During the process of driving the connecting rod module 3 by the lifting module 4, the orthographic projection of the axis of the first hinge shaft 332 on the base plate 2 overlaps with the orthographic projection of the axis of the fourth hinge shaft 343 on the base plate 2.

On such basis that the rotation planes of the first connecting rod 331 and the second connecting rod 341 are parallel or coplanar, and the first connecting rod 331 and the second connecting rod 341 may have trajectory circles of the same radius length, with the second hinge point and the third hinge point as the centers of circle respectively, when the connecting rod module 3 is connected to the lifting module 4 through the first hinge shaft 332, and the lifting direction of the lifting module 4 is along a straight line, the orthographic projections of the axis of the first hinge shaft 332 and the axis of the fourth hinge shaft 343 on the base plate 2 can overlap with each other, so as to ensure that the upper mounting plate 31 and the base plate 2 remain parallel to each other during the process of driving the connecting rod module 3 by the lifting module 4.

In order to stabilize the connection among the upper mounting plate 31, the intermediate frame 32 and the base plate 2, in some embodiments, the first connecting rod 331 is at least three first connecting rods 331 having the same length and arranged parallel to each other, and the second connecting rods 341 is at least three second connecting rods 341 having the same length and arranged parallel to each other.

In order to ensure the balance of the connection among the upper mounting plate 31, the intermediate frame 32 and the base plate 2 when there are at least three first connecting rods 331 or at least three second connecting rods 341, in some embodiments, the orthographic projections of the hinged positions between the at least three first connecting rods or the at least three second connecting rods 341 and the intermediate frame 32 on the base plate 2 are located at different vertices of the polygon respectively. In order to realize the miniaturization of the lifting mechanism, in some embodiments, the lifting mechanism further includes: a rotary module 5, which is fixed to the connecting rod module 3 and capable of driving the carrier tray 1 to rotate in a horizontal plane.

The intermediate frame 32 includes: a first groove 321 arranged on one end of the intermediate frame 32 and penetrating through one end of the intermediate frame 32 along the vertical direction for accommodating the lifting module 4; and a second groove 332 arranged on one end of the intermediate frame 32 away from the first groove 321 and penetrating through the one end of the intermediate frame 32 away from the first groove 321 along the vertical direction for accommodating the rotary module 5.

During the process of driving the connecting rod module 3 by the lifting module 4, the orthographic projections of the first connecting rod assembly 33 and the second connecting rod assembly on the base plate 2 do not overlap with the orthographic projections of the first groove 321 and the second groove 332 on the base plate 2.

The first groove 321 and the second groove 332 form accommodating spaces on both sides of the connecting rod assembly with the connecting rod assembly respectively, thereby providing sufficient space for the lifting module 4 and the rotary module 5, so that the lifting module 4, the rotary module 5, and the connecting rod module 3 are together accommodated within the space area corresponding to the base plate 2 in a relatively compact positional relationship, thereby further allowing an overall modularization and a miniaturized volume of the lifting mechanism.

In order to detect a position of the carrier tray 1, as shown in FIG. 1, in some embodiments, the lifting mechanism further includes: a photoelectric sensor 6, which is arranged on the connecting rod module 3 for detecting the distance of the carrier tray 1 relative to the base plate 2.

In another aspect of the present disclosure, an automated guided vehicle is provided. The automated guided vehicle includes the lifting mechanism according to any of the foregoing embodiments.

Therefore, the lifting mechanism provided by the embodiments of the present disclosure can at least reduce failure of the lifting structure caused by the unbalanced loading of the carried object.

Finally, it should be noted that: the above embodiments are only intended to explain the technical solution of the present disclosure rather than limiting the same; although detailed explanations are made to the present disclosure with reference to preferred embodiments, those of ordinary skill in the art should understand that: it is still possible to make amendments to the embodiments of the present disclosure or equivalent replacements to some of the technical features, which shall all be encompassed in the scope of the technical solution for which protection is sought in the present disclosure without departing from the spirit of the technical solution of the present disclosure.

What is claimed is:

1. A lifting mechanism of an automated guided vehicle, comprising:

a carrier tray;

a base plate;

a connecting rod module connected between the carrier tray and the base plate;

a lifting module, which is arranged on the base plate, connected to the connecting rod module and located on one side of the connecting rod module and configured to cause the carrier tray to translate along a first direction by means of driving the connecting rod module;

wherein the first direction is a lifting direction of the lifting module lifting the connecting rod module or a direction opposite to the lifting direction; and a photoelectric sensor arranged on the connecting rod module, and configured to detect a distance of the carrier tray relative to the base plate.

2. The lifting mechanism according to claim 1, wherein the lifting module comprises:

a first power source;

a lifting bracket connected to the connecting rod module; and a transmission assembly having an input end connected to the first power source and an output end connected to the lifting bracket, configured to transmit power outputted by the first power source to the lifting bracket, so that the lifting bracket drives the connecting rod module to translate along the first direction.

3. The lifting mechanism according to claim 2, wherein the first power source comprises a geared motor, and the transmission assembly comprises:

an intermediate shaft having a hollow structure, wherein an axis of the intermediate shaft is parallel to the first direction, and a first end of the intermediate shaft is connected to an output end of the geared motor;

a lead nut rotatably arranged inside the hollow structure and fixedly connected to a second end of the intermediate shaft; and a lead screw threadedly engaged with the lead nut, and having one end connected to the lifting bracket, wherein an axis of the lead screw is parallel to the first direction, so as to convert a rotational movement of the lead nut into a translational movement of the lifting bracket along the first direction.

4. The lifting mechanism according to claim 3, wherein the transmission assembly further comprises:

a first gear connected to an output end of the first power source; and a second gear fixedly connected to the first end of the intermediate shaft and meshing with the first gear.

5. The lifting mechanism according to claim 3, wherein the lifting module further comprises:

a case, which at least partially accommodates the transmission assembly and is fixedly connected to the first power source to realize integrated assembling and disassembling of the lifting module.

6. The lifting mechanism according to claim 5, wherein a first stepped hole and a second stepped hole having different sizes are provided inside the case, the intermediate shaft has a first stepped shaft section and a second stepped shaft section having different sizes, and the transmission assembly further comprising:

a first tapered roller bearing arranged between the first stepped hole and the first stepped shaft section, and supporting the first end of the intermediate shaft along a radial direction of the intermediate shaft;

a second tapered roller bearing arranged between the second stepped hole and the second stepped shaft section, and supporting the second end of the intermediate shaft along the radial direction and an axial direction of the intermediate shaft; and a locking retainer ring fixedly arranged at the first end of the intermediate shaft, and supporting the first tapered roller bearing along the axial direction.

7. The lifting mechanism according to claim 6, wherein the transmission assembly further comprises:

a first dust-proof ring being in interference fit with an outer cylindrical surface of the locking retainer ring, and in clearance fit with the first tapered roller bearing and the case respectively; and a second dust-proof ring arranged on the case, and located on one side of the second tapered roller bearing adjacent to the lifting bracket.

8. The lifting mechanism according to claim 3, wherein the intermediate shaft comprises:

a first hollow shaft cavity and a second hollow shaft cavity which are arranged along the axis of the intermediate shaft, wherein the second hollow shaft cavity communicates with the first hollow shaft cavity, and an inner diameter of the second hollow shaft cavity is greater than each of the inner diameter of the first hollow shaft cavity and a circumscribed circle diameter of the lead nut;

a portion of the lead screw adjacent to the lifting bracket is fitted within the lead nut and a portion away from the lifting bracket is fitted within the first hollow shaft cavity, when the lifting module is not lifted.

9. The lifting mechanism according to claim 3, wherein a screw fixing hole is provided at a junction between the lifting bracket and the lead screw, the screw fixing hole accommodates the lead screw and restricts a rotation of the lead screw.

10. The lifting mechanism according to claim 5, wherein the lifting module further comprises:

a slide rail fixedly arranged on the lifting bracket, wherein an extending direction of the slide rail is parallel to the first direction; and a guided block arranged on the case and fitted over the slide rail, wherein a cross-sectional shape of the guided block nestedly matched with a cross-sectional shape of the slide rail so as to guide the slide rail to move along the first direction.

11. The lifting mechanism according to claim 10, wherein the slide rail is two slide rails, the guided block is two guided blocks, the two guided blocks are matched with the two slide rails respectively, the two slide rails are arranged symmetrically, and the axis of the lead screw is located on a symmetry plane of the two slide rails;

the case comprises:

two guided block fixing lugs symmetrically arranged on both sides of the case and respectively connected to the two guided blocks.

12. The lifting mechanism according to claim 11, wherein the case comprises:

an electric motor fixing lug fixedly connected to a housing of the first power source, and configured to cause an axis of the output shaft of the first power source to be parallel to the first direction, and cause the axis of the output shaft of the first power source is located on the symmetry plane.

13. The lifting mechanism according to claim 1, further comprising:

a rotary module arranged between the connecting rod module and the carrier tray, and configured to drive the carrier tray to rotate relative to the connecting rod module.

14. The lifting mechanism according to claim 13, wherein the rotary module comprises:

a rotary support inner ring fixedly arranged on one side of the connecting rod module adjacent to the carrier tray; and a rotary support outer ring fixedly arranged on one side of the carrier tray adjacent to the connecting rod module and rotatably supported on the rotary support inner ring.

15. The lifting mechanism according to claim 14, wherein the rotary support outer ring comprises an outer ring gear, and the rotary module further comprises:

a second power source fixedly arranged on the connecting rod module; and a third gear, which is in transmission connection with an output end of the second power source, and configured to drive the carrier tray to rotate by meshing with the outer gear ring.

16. The lifting mechanism according to claim 1, wherein the connecting rod module comprises:

an upper mounting plate configured to support the carrier tray;

an intermediate frame arranged parallel to the upper mounting plate;

a first connecting rod assembly arranged between the upper mounting plate and the intermediate frame, and configured to change a distance between the upper mounting plate and the intermediate frame; and a second connecting rod assembly arranged between the intermediate frame and the base plate, and configured to change a distance between the intermediate frame and the base plate.

17. The lifting mechanism according to claim 16, wherein:

the first connecting rod assembly comprises: a first connecting rod having a first end hinged to the upper mounting plate through a first hinge shaft, and a second end hinged to the intermediate frame through a second hinge shaft;

the second connecting rod assembly comprises: a second connecting rod having a first end hinged to the intermediate frame through a third hinge shaft, and a second end hinged to the base plate through a fourth hinge shaft;

the second hinge shaft and the third hinge shaft are arranged coaxially, so that the second end of the first connecting rod is hinged at the same position of the intermediate frame as the first end of the second connecting rod;

the first connecting rod has the same length as the second connecting rod, and axes of the first hinge shaft, the second hinge shaft, the third hinge shaft, and the fourth hinge shaft are parallel to each other; and the connecting rod module is connected to the lifting module through the first hinge shaft, and an orthographic projection of the axis of the first hinge shaft overlaps with an orthographic projection of the axis of the fourth hinge shaft on the base plate during a process of driving the connecting rod module by the lifting module.

18. The lifting mechanism according to claim 16, wherein the intermediate frame comprises:

a first groove arranged on one end of the intermediate frame and penetrating through the one end of the intermediate frame along a vertical direction, and forming a first accommodating space with the first connecting rod assembly and the second connecting rod assembly; and a second groove arranged on one end of the intermediate frame away from the first groove and penetrating through the one end of the intermediate frame away from the first groove along the vertical direction, and forming a second accommodating space with the first connecting rod assembly and the second connecting rod assembly;

wherein orthographic projections of the first connecting rod assembly and the second connecting rod assembly on the base plate do not overlap with orthographic projections of the first groove and the second groove on the base plate during a process of driving the connecting rod module by the lifting module.

19. An automated guided vehicle comprising the lifting mechanism according to claim 1.

* * * * *